US009763270B2

(12) United States Patent
Bailey

(10) Patent No.: US 9,763,270 B2
(45) Date of Patent: Sep. 12, 2017

(54) INDIRECT PAIRING OF COMMUNICATION DEVICES

(75) Inventor: Neil Bailey, Cambridgeshire (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 747 days.

(21) Appl. No.: 13/004,667

(22) Filed: Jan. 11, 2011

(65) Prior Publication Data

US 2012/0030465 A1 Feb. 2, 2012

(30) Foreign Application Priority Data

Jan. 12, 2010 (GB) .................................. 1000448.9

(51) Int. Cl.
| | | |
|---|---|---|
| G06F 15/16 | (2006.01) | |
| G06F 15/173 | (2006.01) | |
| G06F 15/177 | (2006.01) | |
| G06F 7/04 | (2006.01) | |
| G06F 17/30 | (2006.01) | |
| H04L 29/06 | (2006.01) | |
| H04L 9/32 | (2006.01) | |

(Continued)

(52) U.S. Cl.
CPC ........... *H04W 76/02* (2013.01); *H04W 12/06* (2013.01)

(58) Field of Classification Search
CPC ... H04W 76/02; H04W 76/023; H04W 12/04; H04W 12/06; H04W 12/08; H04L 9/321; H04L 9/0822; H04L 63/162; H04L 2209/80; H04L 12/66; H04L 12/5692; H04L 12/5695; H04L 47/16; H04L 47/724; H04L 47/785; H04L 47/805; H04L 47/825; H04L 63/08; H04L 63/065; H04L 63/0272; H04L 63/164
USPC .......... 463/43; 713/155, 168, 171, 175, 182; 709/203, 217, 219–220, 227–228, 230; 726/3, 5
See application file for complete search history.

(56) References Cited

U.S. PATENT DOCUMENTS 5,600,722 A * 2/1997 Yamaguchi et al. ........... 713/155
7,194,507 B2 * 3/2007 Sato et al. ..................... 709/203
(Continued)

FOREIGN PATENT DOCUMENTS

CA WO 03079607 A1 * 9/2003 ............... H04L 9/30

OTHER PUBLICATIONS

Karygiannis et al., Wireless Network Security.,Special Publication 800-48., Nov. 2002 National Institute of Standards and Technology, U.S. Department of Commerce, 119 pages.*

(Continued)

*Primary Examiner* — Farzana Huq
(74) *Attorney, Agent, or Firm* — Paradice and Li LLP

(57) ABSTRACT

A method for establishing a communication link between two devices, the communication link employing a protocol that provides for link establishment information sufficient for establishing a link between two devices to be negotiated between those devices; the method comprising: establishing communication links between each of the two devices and one or more further devices; transmitting from the one or more further devices to each of the two devices information that defines link establishment parameters for a link between the two devices; and establishing the link between the two devices using the defined link establishment parameters.

19 Claims, 2 Drawing Sheets

(51) Int. Cl.
*G06F 21/00* (2013.01)
*H04W 76/02* (2009.01)
*H04W 12/06* (2009.01)

(56) References Cited

U.S. PATENT DOCUMENTS

| | | | |
|---|---|---|---|
| 7,653,037 B2* | 1/2010 | Prakash et al. | 370/338 |
| 8,085,937 B1* | 12/2011 | Bradley, II | H04L 9/0825 |
| | | | 380/259 |
| 2002/0164026 A1* | 11/2002 | Huima | H04L 9/0869 |
| | | | 380/247 |
| 2005/0198029 A1* | 9/2005 | Pohja | H04M 1/7253 |
| 2005/0266798 A1* | 12/2005 | Moloney | H04L 63/0435 |
| | | | 455/41.2 |
| 2006/0083187 A1 | 4/2006 | Dekel | |
| 2006/0245595 A1* | 11/2006 | Bell | H04L 63/061 |
| | | | 380/278 |
| 2006/0285502 A1* | 12/2006 | Bigioi | H04L 67/14 |
| | | | 370/254 |
| 2007/0005971 A1* | 1/2007 | Leung et al. | 713/171 |
| 2007/0123165 A1 | 5/2007 | Sheynman et al. | |
| 2007/0249422 A1* | 10/2007 | Podoloff | 463/43 |
| 2008/0070503 A1 | 3/2008 | Bang | |
| 2008/0076577 A1* | 3/2008 | Brosnan et al. | 463/42 |
| 2008/0134281 A1 | 6/2008 | Shinde et al. | |
| 2009/0055541 A1* | 2/2009 | Sato et al. | 709/228 |
| 2009/0063851 A1* | 3/2009 | Nijdam | H04L 63/064 |
| | | | 713/155 |
| 2009/0305789 A1* | 12/2009 | Patil | A63F 13/06 |
| | | | 463/42 |
| 2010/0153727 A1* | 6/2010 | Reznik | H04L 9/0822 |
| | | | 713/171 |
| 2011/0176522 A1* | 7/2011 | Choi | H04W 56/0045 |
| | | | 370/336 |
| 2012/0244952 A1* | 9/2012 | Patil | A63F 13/06 |
| | | | 463/42 |

OTHER PUBLICATIONS

Reviews & Brand Information on Bluetooth., Trademarkia, Inc., retrieved from http://www.trademarkia.com/bluetooth-75643769.html on Aug. 8, 2012. 5 pages.*
German Office Action dated Nov. 16, 2012 in corresponding German patent application.

* cited by examiner

INDIRECT PAIRING OF COMMUNICATION DEVICES

BACKGROUND OF THE INVENTION

This invention relates to configuring devices so that they can communicate with each other.

In many communication systems it is desirable to perform certain identification or configuration steps as part of establishing a communication link. For example two devices that require to communicate with each other may be required to authenticate each other, to ensure that they are not about to communicate with an untrusted device, and to establish security parameters that will be used for encrypting and decrypting traffic data that is subsequently transmitted between the devices.

In the Bluetooth communication system, a process known as pairing is used to help in authenticating devices to each other, and for establishing encryption parameters. The pairing process is described in sections C.4.2.2 and C.4.2.7 of version 4.0 of the Bluetooth Specification, to which the reader is referred for further details of the process. The entire contents of that specification are incorporated herein by reference.

Two pairing procedures are available in Bluetooth: standard pairing and secure simple pairing.

The standard pairing procedure between two devices A and B comprises the following three stages:
1. Each device generates a shared secret initialisation key ($K_{init}$) based on a secret PIN. To achieve this, device A sends a random number (IN_RANDA) to device B. Then each device computes the initialisation key ($K_{init}$) as a function (E22) of the random number (IN_RANDA), the address of device B (ADDRB), the secret PIN and the PIN length. The PIN may be entered by a user or pre-stored in one or both of the device(s).
2. The devices securely exchange random numbers using the initialisation key ($K_{init}$). To achieve this, devices A and B generate random numbers LK_RANDA and LK_RANDB respectively. Then each device XORs its own random number with the initialisation key ($K_{init}$) and transmits the resulting value to the other device. Finally, each device recovers the random number of the other device by XORing the received value with the initialisation key ($K_{init}$).
3. Each device generates the link key ($K_{link}$) using the exchanged random numbers. To achieve this, each device generates two values, LK_KA and LK_KB. LK_KA is generated as a function (E21) of the address of device A (ADDRA) and the random number of device A (LK_RANDA). LK_KB is generated as a function (E21) of the address of device B (ADDRB) and the random number of device B (LK_RANDB). Then each device generates the link key ($K_{link}$) by bitwise modulo-2 addition of LK_KA and LK_KB.

The secure simple pairing procedure between two devices A and B comprises the following three stages.
1. Each device generates a shared secret Diffie-Hellman key (DHKey). To achieve this, each device generates a Diffie-Hellman public-private key pair. Each device then transmits the public key part of its public-private key pair to the other device. Finally, each device generates the Diffie-Hellman key (DHKey) as a function (P192) of its own private key and the other device's public key.
2. Two authentication stages are performed during which the devices exchange nonces (random values) NA and NB.
3. Each device generates the link key ($K_{link}$) using the Diffie-Hellman key (DHKey). Each device then generates the link key ($K_{link}$) as a function (f2) of the Diffie-Hellman key (DHKey), the nonces (NA, NB) exchanged during the authentication stages, the addresses of the devices (ADDRA, ADDRB), and a string (btlk).

The result of both pairing processes is that the devices share a link key ($K_{link}$). $K_{link}$ is subsequently used as part of the algorithms for authenticating the devices to each other and for encrypting data between the devices. In the authentication algorithm, device A transmits a random number (AU_RANDA) to device B; each device computes a value which is a function (E1)) of the random number (AU_RANDA), the link key ($K_{link}$) and the address of device B (ADDRB) and device B transmits its computed value to device A. Device A then compares the response from device B with its own computed value. If the values match then the link is authenticated. In the encryption algorithm a cipherstream is generated as a function of the link key, and the cipherstream is combined with the data that is to be conveyed over the link so as to generate an encrypted data stream for transmission.

Once $K_{link}$ is shared between a pair of devices, the devices can store it, normally in non-volatile memory, so that it can later be used for authentication and encryption without the pairing process having to be repeated. Once a pair of devices have jointly negotiated and stored a link key for communication with each other they are said to be paired.

After two devices have paired, $K_{link}$ can be re-used as described above on a subsequent occasion. If the two devices will fulfil the same functions when they connect on the subsequent occasion then the devices will work satisfactorily. However, if one or both of the devices has changed functions when they re-connect then the devices might not be correctly configured when they re-use the stored pairing information.

One example of a situation in which this might happen is in gaming systems. Many gaming systems include a gaming console that acts as a central processor and multiple hand-held controllers that can be used by individual players. It is undesirable for a user to have to pair a hand-held controller with the gaming console each time the gaming system is turned on. For that reason, pairing information is conventionally stored by each hand-held controller so it can readily establish a link to the console at start-up. It is becoming increasingly common for each user of a gaming system to have two physically separate hand-held controllers with which they interact with the games console. A player's controllers will be referred to as X and Y. One approach by which a player's controllers can communicate with the console is for only controller X to have a communication link to the console and for controller Y to have a communication link to controller X, so that controller Y communicates with the console via the first controller. A difficulty then arises when the system is subsequently used. On that future occasion, a player might not pick up the same controllers: he might pick up two controllers that were previously being used by two different players. If the controllers re-use their stored pairing information then the player's Y controller could then be communicating with the console via another player's X controller. This is a problem because the console might interpret the player's inputs with the Y controller to be coming from that other player, and because the other player's X controller might not be in communication range of the first player's Y controller. It is possible for the controllers to be re-paired when this situation arises, but this takes time and uses energy.

There is a need for an improved mechanism of establishing communication links using pre-stored information.

SUMMARY OF THE INVENTION

According to one aspect of the present invention there is provided a method for establishing a communication link between two devices, the communication link employing a protocol that provides for link establishment information sufficient for establishing a link between two devices to be negotiated between those devices; the method comprising: establishing communication links between each of the two devices and one or more further devices; transmitting from the one or more further devices to each of the two devices information that defines link establishment parameters for a link between the two devices; and establishing the link between the two devices using the defined link establishment parameters.

According to a second aspect of the present invention there is provided a communication system comprising two devices and one or more further devices, the two devices and the one or more further devices being configured for establishing a communication link between two devices, the communication link employing a protocol that provides for link establishment information sufficient for establishing a link between two devices to be negotiated between those devices by a method comprising: establishing communication links between each of the two devices and one or more further devices; transmitting from the one or more further devices to each of the two devices information that defines link establishment parameters for a link between the two devices; and establishing the link between the two devices using the defined link establishment parameters.

The defined link establishment parameters may include a link key. The step of establishing the link between the two devices using the defined link establishment parameters may comprise the step of each of the two devices using the link key for one or more of: (i) authentication of the other of the two devices and (ii) encryption of communications over the link.

The defined link establishment parameters transmitted to each of the two devices may include a device address of the other of the two devices. The step of establishing the link between the two devices using the defined link establishment parameters may comprise the step of each of the two devices using the device address of the other of the devices for one or more of: (i) authentication of the other of the two devices, (ii) encryption of communications over the link and (iii) addressing communications over the link.

The protocol may be Bluetooth.

The step of establishing communication links between each of the two devices and one or more further devices comprises the one or more further devices operating in discoverable mode.

Each of the two devices may be configured to store the link establishment information in such a way that it is not subsequently available to the respective device after it has been powered down.

The two devices may be user input devices. The two devices may be user input devices having different user interfaces. The two devices may be games controllers.

The one or more further devices may comprise a computing device such as a personal computer or a games console.

One of the two devices may be configured to provide user input that it has sensed to the computing device by way of the communication link to the other of the two devices.

The said other of the two devices may be configured to provide user input that it has sensed and user input that it has received from the said one of the two devices to the computing devices by way of a communication link between the said other of the two devices and the computing device.

The defined link establishment parameters transmitted to at least one of the two devices may include information indicating an operational state and the step of establishing the link between the two devices using the defined link establishment parameters comprises the step of the at least one device or each of the two devices adopting the operational state defined by the link establishment information transmitted to it.

The operational state defined by the link establishment information transmitted to one of the devices may be a state in which it awaits the initiation of a link from another device.

The operational state defined by the link establishment information transmitted to one of the devices may be a state in which it initiates a link to the other device.

BRIEF DESCRIPTION OF THE DRAWINGS

The present invention will now be described by way of example with reference to the accompanying drawings, in which.

DETAILED DESCRIPTION OF THE INVENTION

The example embodiments described below use the Bluetooth communication system. This is just an example. Other communication systems can be used, as is described in further detail below.

Figure 1:
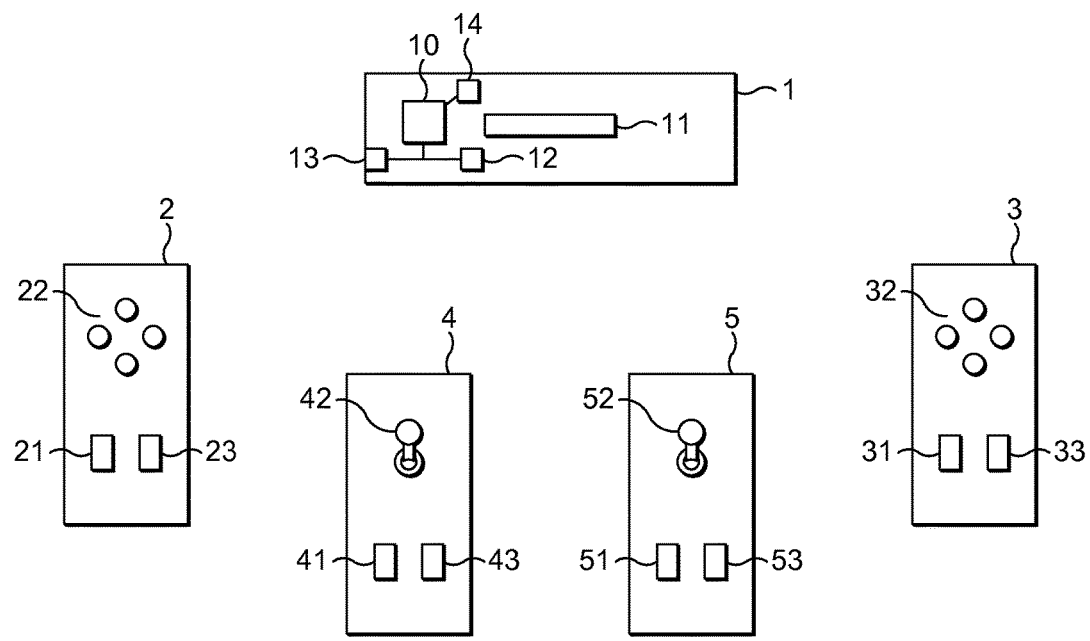
FIG. 1 is a schematic diagram of a gaming system.

The gaming system shown in FIG. 1 comprises a gaming console 1, two hand-held controllers 2, 3 of a first type and two hand-held controllers 4, 5 of a second type. The gaming console and each controller each comprise a Bluetooth communication device. The Bluetooth communication device is shown in more detail in FIG. 2. The communication devices are configured so as to be able to pair with each other by negotiating and storing pairing information that allows the devices to subsequently establish communications without the need for pairing. In the system of FIG. 1 at least some of the communication devices are configured to be able to acquire pairing information to be used for communicating with a device without themselves having paired with that device. This allows those devices to readily establish a communication link with a device that they have not previously paired with. One way in which that pairing information can be acquired is by transmission from the gaming console 1, but other mechanisms can be used.

Figure 2:
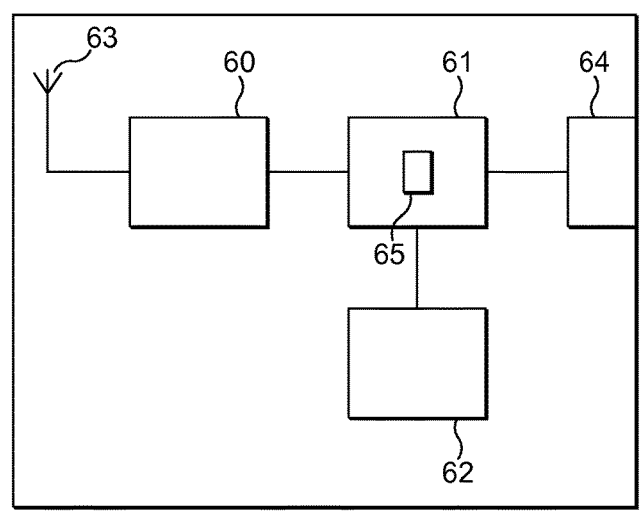
FIG. 2 illustrates a communication device.

In more detail, the gaming console 1 comprises a central processing unit (CPU) 10, a media reader 11, a memory 12 for use by the CPU 10, an audio and video interface 13 and a communication device 14 of the type shown in FIG. 2. Each controller comprises a CPU 21, 31, 41, 51, a user input detector 22, 32, 42, 52 and a communication device 23, 33, 43, 53 of the type shown in FIG. 2. The user input detector could, for example include one or more of a keypad, a motion sensor, a strain gauge or any other sensor capable of accepting input from a user. If the communication device of the controller is sufficiently powerful then the separate CPU of the controller could be dispensed with and its functions could be performed in a CPU of the communication device. Each controller comprises a local energy source such as a battery (not shown in FIG. 1).

Each communication device is as shown in more detail in FIG. 2. It comprises a transceiver 60, a central processing unit 61, a non-volatile memory 62 and an antenna 63. The entire communication device, or the entire communication device with the exception of the antenna, could be implemented on a single integrated circuit; or it could be implemented using multiple integrated circuits or discrete components. The transceiver 60 is suitable for transmitting and receiving signals according to the protocol that is in use; in this example the Bluetooth protocol.

The non-volatile memory stores program code for execution by the CPU 61 to execute the baseband functions required to implement that protocol. The stored code may also implement functionality that allows the communication device to communicate with its host to determine whether it is installed in a controller, and if so of which type, or in the console; and to perform certain functions differently depending on the outcome of that determination. The communication device has an input/output interface 64 which provides a data link to the host device in which it is installed. By means of this, the communication device can receive from the host device data that is to be transmitted over the air, which it subsequently transmits; and can pass to the host device data that it has received over the air. The input/output interface can also be used when determining the type of the host. Thus, when the system is in operation user input can be detected by the user input detector of a controller. That input is passed via the input/output interface to the communication device of the controller, which transmits it over the air to the communication device of the console. The console can then act in accordance with that input, for example by advancing gameplay in response to the user's inputs. Data may be also passed from the console to the controller, for example to configure the controller, to cause it to vibrate if it has an inbuilt vibration generator or to cause it to power up or power down some or all of its functions.

The mechanism by which the devices derive pairing information will now be described in more detail. That mechanism is defined by the program code stored in the non-volatile memories of the communication devices. In a typical system the pairing information will include or consist of the link key ($K_{link}$) together with an indication of the device with which that key is to be used, for example that device's address or another identifier.

Figure 3:
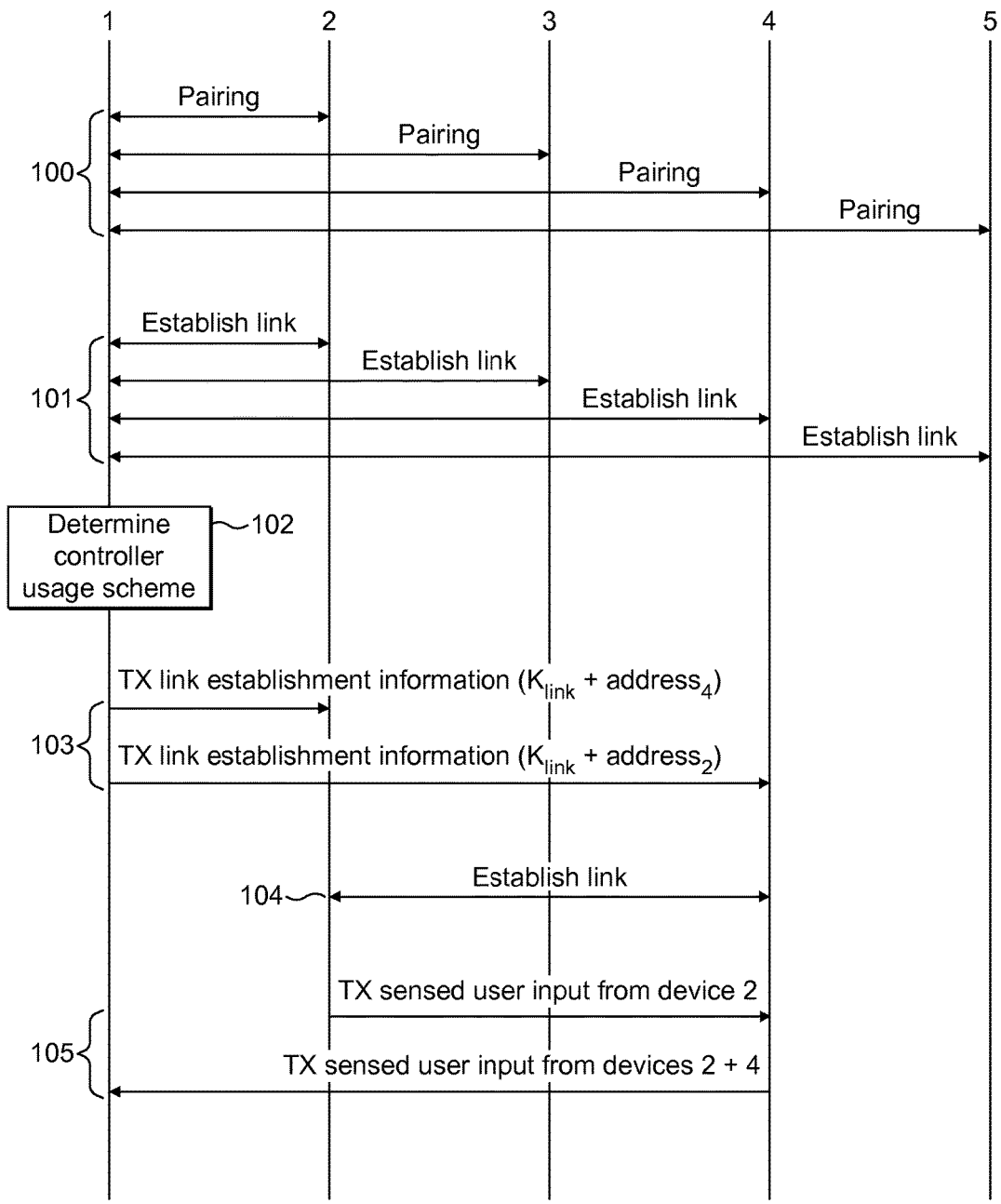
FIG. 3 illustrates steps in a pairing protocol.

One example mechanism is illustrated in FIG. 3.
1. In a first phase, each of the controllers 2, 3, 4 and 5 pairs with the console 1. (Step 100).
2. Immediately after that, or on a subsequent occasion, each controller is readied for use and establishes a Bluetooth communication link between itself and the console using the link key that was stored when pairing was performed. (Step 101).
3. The console determines that two of the controllers, for instance controllers 2 and 4, are to be used by a single player. (Step 102). That determination may be made in a number of ways. For example, the user could simultaneously press a button or a combination of buttons on the two controllers; the controllers could be configured to transmit notification of those button presses to the console; and the console could be configured to interpret two such notifications being received from two devices within a pre-set time period as indicating that those devices are to be used by a single player. Alternatively, the user could bring the devices into proximity with each other; that state could be detected by one or both of the devices; that/those devices could notify the console of that fact; and the console could interpret that as indicating that the devices are to be used by a single user. Alternatively, the user could indicate the particular devices that he is using to the console by interacting using the devices with a menu function of the console.
4. The console transmits pairing information to the two devices 2, 4 for use in communicating with each other. (Step 103). The information is transmitted over the Bluetooth link that the console has to the respective controller. For each of the two devices, the pairing information that is transmitted could be the Bluetooth address of the other one of the devices and a value that is to be used as $K_{link}$. The same $K_{link}$ value is sent to both of the two devices. The $K_{link}$ value could be generated randomly (including pseudo-randomly) by the console.
5. The two devices 2, 4 establish a Bluetooth communication link with each other using the received pairing information. (Step 104). In establishing the link they use the pairing information as if they had derived it themselves from pairing directly with each other.
6. The two devices 2, 4 operate for providing user input to the console. (Step 105). Conveniently, one of the two devices 2, 4 can send its input to the console via the other of the two devices. One of the devices may be of a first type that is configured to communicate indirectly with the console, and the other of the devices may be of a second type that is configured to relay input data from devices of the first type to the console. Alternatively, the devices may be configured to negotiate between each other which is to perform the relaying function and to then behave accordingly. In the example of FIG. 3, user input data sensed by the user interface of device 2 is relayed to the console via device 4, whereas user input information sensed by the user interface of device 4 is sent directly (together with user input information received from device 2) to the console 1.

This mechanism can be varied in a number of ways, which include but are not limited to the following.
1. The pairing information that is to be used by the controllers could be distributed from multiple devices rather than just one. Two or more distribution devices could each hold a common database of pairing information, including a list of the device address of the devices for which the pairing information is usable and a list of link keys usable by those devices. There could be a single link key for each of those devices, or a pre-assigned link key for each possible pairing of those devices. The link keys could be generated randomly and stored in the database. Alternatively, the distribution devices could each hold a common distribution key and could generate a link key for a pairing of two devices as the result of a function that takes as input the addresses of the two devices and the common distribution key. The distribution devices could then independently pass a suitable link key to any device that needs one.
2. If the pairing information is distributed from a single device then that device need not be the console. It could be distributed by another device (e.g. one of the controllers or a dedicated unit) with which the controllers have previously paired. In this situation, the controller could also receive pairing information from the same source to allow it to pair with the appropriate ones of the controllers.
3. The pairing information could be distributed by a mechanism other than the same wireless protocol that the pairing information is to be used with. For example, the controllers could physically plug into the console, and the pairing information could be distributed over a wired link such as a USB interface.
4. The pairing information could be passed indirectly to the controllers. The controllers could be sent information from which they can compute the link key, optionally using additional data stored in the controllers.

5. Rather than the pairing information being pushed to a pair of controllers, the controllers could each determine that they are to operate together and could pull the pairing information from a distributing device.

The pairing information sent to a device could include additional information that indicates the manner in which the device is to operate for establishing the link to the counterpart device with which it is to communicate. This could include the operational state in which the device is to maintain itself until a link is established or has begun to be established. For example, the pairing information could be augmented to additionally include information that indicates the future state of the device after a hard or soft reset. Alternatively or in addition the pairing information could include information that indicates whether the device is to initiate the link with the counterpart device, or whether it is to wait for the counterpart device to initiate the link. In the example of a Bluetooth system, the device that is to wait for the counterpart device to initiate the link could enter the Bluetooth connectable state on receiving an indication of that. The state could be a power state. The state could be a state in which connections are actively initiated, or a state in which the device waits for connections to it without actively initiating connections itself.

The devices that receive the pairing information are configured so as to establish a link with each other in dependence on that information. In practice, that may be by virtue of the software held in the devices' non-volatile memories having been configured to cause the devices to operate in that way.

A Bluetooth device would normally store pairing information in non-volatile memory. In the present system, having received pairing information in one of the ways described above a communication device could store the information in its non-volatile memory. Optionally it could store the information in volatile memory, for example memory 65 internal to the CPU. In this way, the pairing information is not available to it when the system is restarted. The controllers would still preferably store the pairing information relating to links with the console in non-volatile memory.

The pairing information can be sent over any suitable data transmission mechanism. If the pairing information is distributed over a Bluetooth link then it could, for example, be sent across an L2CAP channel or using AT commands over an RFCOMM link.

Additional information could be distributed along with the pairing information, for example information on the capabilities of the other device with which communication is to take place.

In the Bluetooth system, before the link key is negotiated in the pairing process one device must be made discoverable and the device to which it is to be paired must then scan to find the discoverable device. Having a device operate in discoverable mode uses more power than having a device be non-discoverable. The console is likely to be mains-powered whereas the controllers are likely to be powered from an on-board energy store such as a battery. In that situation it is preferable if the console operates in discoverable mode when the controllers link to it. If the system works in this way then when a controller is turned on, it can identify that it has no ability to link to a console (either because it has no pairing information stored for a console, or because any console for which it has stored pairing information is unavailable); scan for a console that is in discoverable mode; and having found one, pair with it.

Preferably, the controllers pair with the console using secure simple pairing so that there is no need to enter a PIN at either device.

The principles described above can be applied to systems that use wired or wireless communication protocols other than Bluetooth. Many protocols rely on storing information that allows a previously established link to be resumed. That information often comprises a key and an identity/address for the counterpart device. One example is the pair of an SSID and a key in an 802:11 device.

Preferably the pairing information is distributed over an encrypted link. In a Bluetooth system link encryption can be achieved in the conventional way, by XORing the plaintext data with a cipherstream derived from data including the link key that is in use over the encrypted link.

The principles described above can be applied to systems other than gaming hardware. For example, they could be used to configure links between sets of audio/visual devices that are to intercommunicate selectively: as when a particular set of headphones is to be used with a particular music player; or between sets of computer peripherals: as when a particular mouse and keyboard are to be used with a particular general purpose computer. Optionally, one of the mouse and the keyboard could communicate with the computer via the other. Optionally, in an office environment there may be many interchangeable mice and keyboards which could be chosen by users.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for establishing a communication link between a first device and a second device, the method performed by a third device and comprising:
   establishing a first direct link between the first device and the third device;
   establishing a second direct link between the second device and the third device;
   determining that the first device and the second device are configured for use by a single user based on notifications received, by the third device, from the first device and the second device within a time period;
   generating one or more link establishment parameters for a third direct link between the first device and the second device, wherein the one or more link establishment parameters include a device address of at least one of the first device or the second device to be used for authentication of the third direct link, encryption of communications over the third direct link, and addressing communications over the third direct link;
   transmitting the one or more link establishment parameters from the third device to the first device and to the second device via the first direct link and the second direct link, respectively; and establishing the third direct link between the first and second devices using the one or more link establishment parameters.

2. The method of claim 1, wherein the link establishment parameters include a link key for authentication of the third direct link or (ii) encryption of communications over the third direct link.

3. The method of claim 1, wherein the first, second, and third direct links are established according to a Bluetooth protocol.

4. The method of claim 1, wherein the first device and the second device are user input devices.

5. The method of claim 4, wherein the first device and the second device have different user interfaces.

6. The method of claim 4, wherein the first device and the second device are game controllers.

7. The method of claim 4, wherein the third device comprises a computing device.

8. The method of claim 7, wherein the computing device is a game console.

9. The method of claim 7, wherein the first device is configured to sense first user input and to transmit the first user input to the second device via the third direct link.

10. The method of claim 1, wherein the link establishment parameters include an operational state indicator to indicate that at least one of the first device and the second device should adopt an indicated operational state.

11. The method of claim 10, wherein the operational state is a state in which the first device or the second device awaits initiation of a link from another device.

12. The method of claim 10, wherein the operational state is a state in which the first device initiates a link to the second device.

13. A wireless device, comprising:
one or more processors; and
a memory storing one or more programs comprising instructions that, when executed by the one or more processors, cause the wireless device to establish a communication link between a first device and a second device by performing operations comprising:
establishing a first direct link with the first device;
establishing a second direct link with the second device;
determining that the first device and the second device are configured for use by a single user based on notifications received, by the wireless device, from the first device and the second device within a time period;
generating one or more link establishment parameters for a third direct link between the first device and the second device, wherein the one or more link establishment parameters include a device address of at least one of the first device or the second device to be used for authentication of the third direct link, encryption of communications over the third direct link, and addressing communications over the third direct link;
transmitting the one or more link establishment parameters to the first device and to the second device via the first direct link and the second direct link, respectively; and
establishing the third direct link between the first and second devices using the one or more link establishment parameters.

14. The wireless device of claim 13, wherein execution of the instructions causes the wireless device to perform operations further comprising:
receiving user input, sensed by the first device, from the second device via the second direct link.

15. The wireless device of claim 13, wherein execution of the instructions causes the wireless device to perform operations further comprising:
transmitting data to the first device via the second device using the first and third direct links.

16. The wireless device of claim 13, wherein the first device is a wireless mouse, and the second device is a wireless keyboard.

17. The wireless device of claim 13, wherein the wireless device is a gaming console, the first device is a first game controller, and the second device is a second game controller.

18. The wireless device of claim 13, wherein execution of the instructions for determining that the first device and the second device are configured for use by a single user comprises:
determining that the first device and second device each receive button pushes within the time period.

19. The method of claim 1, wherein the determining that the first device and the second device are configured for use by a single user comprises determining that the first device and the second device each receive button pushes within the time period.

* * * * *